United States Patent
Tanner

(10) Patent No.: US 6,512,650 B1
(45) Date of Patent: Jan. 28, 2003

(54) VELOCITY CONTROL METHOD FOR RAMP UNLOADING HEADS OFF OF DISKS IN A DISK DRIVE

(76) Inventor: Brian Tanner, 5947 Friar Way, San Jose, CA (US) 95129

( * ) Notice: Subject to any disclaimer, the term of this patent is extended or adjusted under 35 U.S.C. 154(b) by 0 days.

(21) Appl. No.: 09/352,189

(22) Filed: Jul. 12, 1999

(51) Int. Cl.[7] .............................................. G11B 21/02
(52) U.S. Cl. ........................................... 360/75; 360/69
(58) Field of Search ...................... 360/69, 75, 78.01, 360/78.04, 78.06, 78.07, 78.08, 78.12

(56) References Cited

U.S. PATENT DOCUMENTS 5,764,437 A * 6/1998 Meyer et al. ............. 360/254.3
5,969,899 A * 10/1999 Utenick et al. ........... 360/75 X

* cited by examiner

Primary Examiner—Andrew L. Sniezek

(57) ABSTRACT

A velocity control method for ramp unloading of heads off of a disk comprises providing a VCM settling period for measuring the VCM velocity, and in response to the measured VCM velocity, controlling an applied VCM current to maintain the VCM velocity between a minimum velocity and a maximum velocity.

20 Claims, 2 Drawing Sheets

VELOCITY CONTROL METHOD FOR RAMP UNLOADING HEADS OFF OF DISKS IN A DISK DRIVE

FIELD OF INVENTION

The invention relates to disk drives and storage medium devices, and more particularly to velocity control for disk drive actuators.

BACKGROUND OF INVENTION

A conventional disk drive comprises an actuator for positioning a set of read and write heads over an associated set of data storage disk surfaces. During a typical power off occurrence whether by user design or a sudden loss of power, it is desirable to provide ahead retraction method to safely move the heads off of their associated disk surfaces to prevent damaging the disk surfaces and causing data loss resulting from head-to-disk surface contact. Moreover, the head retraction method must be functional under a reduced-power or power loss condition. In prior head retraction methods, during a power loss, the energy from the rotational mass of the rotating disks is converted by the spindle motor coupled to the disks into back electromotive force (EMF) and applied directly to a voice control motor (VCM) that drives the actuator transporting the heads. However, since the ramp loading and unloading reliability is a critical function of the velocity of the VCM as the actuator moves near and across a head ramp, providing accurate control over all VCM velocities is essential to maximizing the reliability of the head ramp unload or load operations. There is therefore a need for an efficient means of controlling the VCM velocities during the ramp load and unload process.

SUMMARY OF INVENTION

The invention resides in a velocity control method for ramp unloading of heads off of a disk in a disk drive. The method includes providing a VCM settling period for measuring the VCM velocity, and in response to the measured VCM velocity, controlling an applied VCM current to maintain the VCM velocity between a rninimum velocity and a maximum velocity.

DETAILED DESCRIPTION

Figure 1:
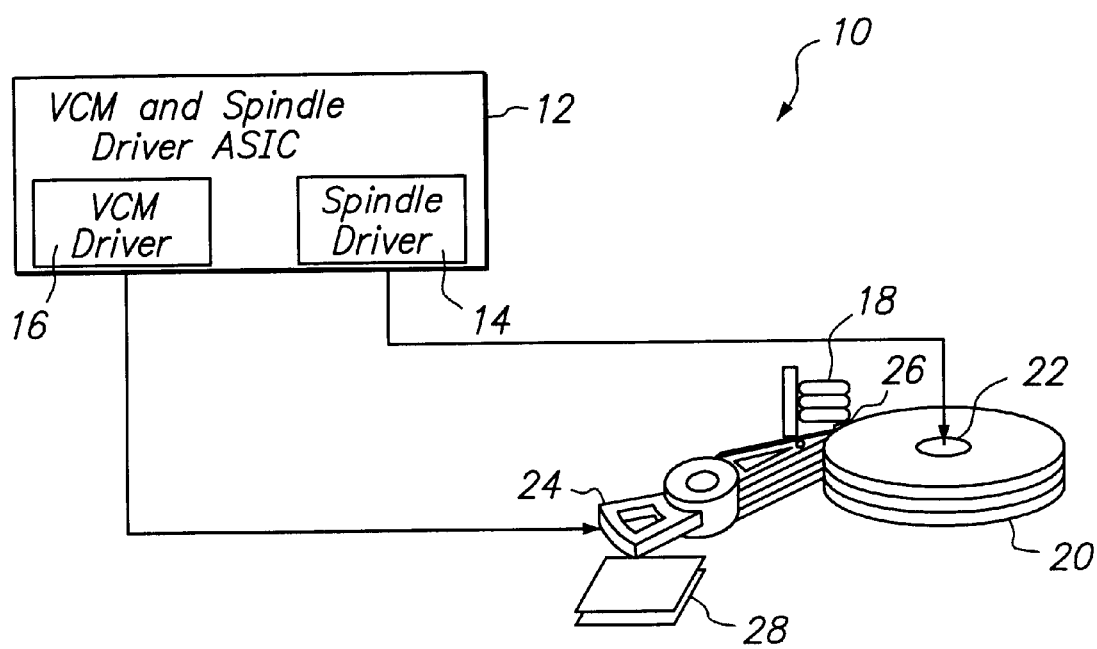
FIG. 1 is a simplified block diagram of a velocity control system for ramp unloading heads off of disks in a disk drive provided in accordance with the principles of the invention.

FIG. 1 illustrates a simplified block diagram of velocity control system 10 for ramp unloading read and write heads off of disk surfaces of storage disks in a disk drive provided in accordance with the principles of the invention. Velocity control system 10 comprises driver 12, ramp 18, data storage disks 20, spindle motor 22, actuator 24, and one or more read and write heads 26. Driver 12 comprises spindle driver 14 and VCM driver 16 that are coupled to spindle motor 22 and actuator 24, respectively. Disks 20, or other such data storage media or platters, are coupled to spindle motor 22 that drives the rotational spinning of the disks 20 during operation. Actuator 24 is coupled to heads 26 and includes VCM 28.

During a reduced power or power loss condition, VCM driver 16 measures VCM velocity such as by measuring a VCM terminal voltage, and subtracting a voltage drop across the internal resistance of VCM 28, thereby deriving the back EMF voltage that is proportional to the actuator velocity and inductive fly back voltages. If the current in VCM 28 is maintained at a nearly constant value, then the magnitude of the inductive fly back voltage transient can be neglected. Thus, VCM velocity can be set equivalent to the measured difference in the terminal voltage across VCM 28 and the voltage drop across the internal resistance of VCM 28. Once the measured VCM velocity is determined, then VCM driver 16 detects whether the measured VCM velocity is between minimum velocity A and maximum velocity D. In response to the detected comparison, VCM driver 16 enables or disables a VCM decelerate current or a VCM accelerate current to maintain the VCM velocity between minimum velocity A and maximum velocity D. The minimum and maximum velocity thresholds can be adjusted to match user determined safe VCM speed to move heads 26 off of disks 20.

Spindle driver 14 is coupled to spindle motor 22 to receive the converted back EMF from spindle motor 22, and that back EMF is provided to VCM driver 16 for VCM velocity measurement to control actuator 24 and move heads 26 within the specified minimum and maximum velocities.

Figure 2:
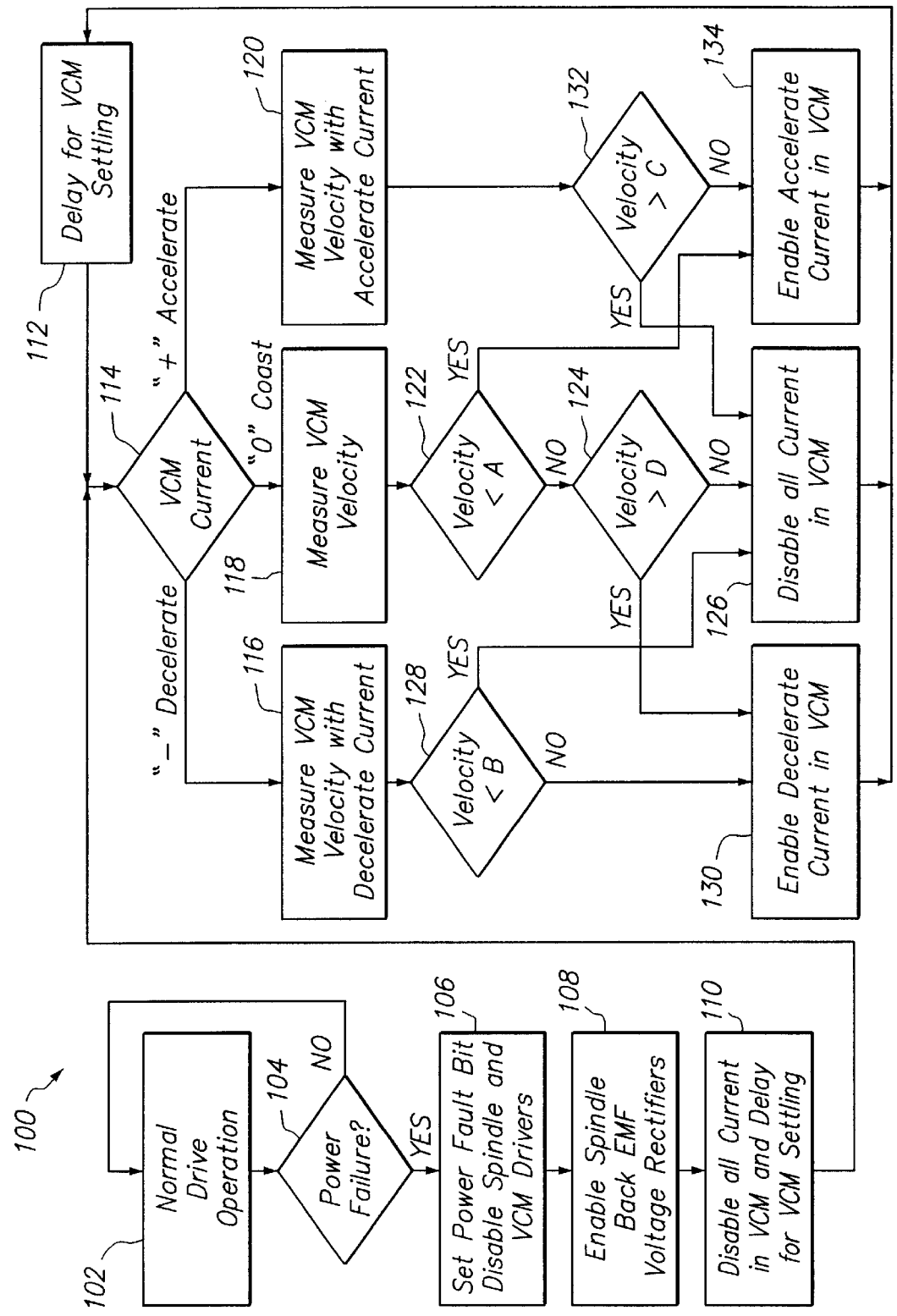
FIG. 2 is a flow chart of a velocity control method for ramp unloading heads off of disks in a disk drive using the system of FIG. 1 provided in accordance with the principles of the invention.

FIG. 2 is a flow chart of velocity control method 100 for ramp unloading heads off of disks 20 using velocity control system 10 as provided in accordance with the principles of the invention. During normal disk drive operation in step 102, if no power failure is detected in step 104 then normal operation of the disk drive is maintained. However, if a power failure is detected in step 104, then driver 12 sets a power fault bit to disable spindle driver 14 and VCM driver 16 in step 106. Correspondingly, driver 12 enables one or more spindle back EMF voltage rectifiers in step 108, disables all current in VCM 28 and initiates a VCM settling process in step 110.

The VCM settling process includes first detecting in step 114 whether a VCM current is equivalent to a VCM decelerate ("−") current, a VCM coast ("0") current, or a VCM accelerate ("+") current. If a VCM decelerate current is detected in step 114 then the VCM velocity is measured with the VCM decelerate current in step 116. If the measured, velocity in step 116 is less than maximum velocity B in step 128 then the VCM current is disabled in step 126, otherwise the VCM decelerate current is enabled in step 130. If a coast current is detected in step 114, then the VCM velocity is measured in step 118. If the measured velocity in step 118 is less than minimum velocity A in step 122 then the VCM acceleration current is enabled in step 134, otherwise the measured velocity in step 118 is compared with maximum velocity D in step 124. If the measured velocity in step 118 is greater than maximum velocity D in step 124 then the VCM decelerate current is enabled in step 130, otherwise the VCM current is disabled in step 126. If an accelerate current is detected in step 114, then the VCM velocity is measured with the accelerate current in step 120. If the measured velocity in step 120 is greater than minimum velocity C in step 132 then the VCM current is disabled in step 126, otherwise the VCM accelerate current is enabled in step 134.

The VCM velocity thresholds A, B, C and D correspond to enable acceleration, disable deceleration, disable acceleration and enable deceleration thresholds, respectively. The thresholds are structured in increasing velocities such that the actuator velocity is maintained between the A and D thresholds. This arrangement gives deadbands between the accelerate and decelerate modes and allows for large errors to exist in the estimated VCM resistance that is used in the velocity measurement technique. It is important to note that even though the accuracy of the VCM velocity measurement is not good when the estimate of the VCM resistance is only slightly in error, the A and D thresholds are detected with excellent accuracy because there is no current in VCM 28 when these thresholds are tripped. This puts well controlled velocity limits on actuator 24 even when there is error in the resistance estimate of VCM 28.

Accordingly, the VCM velocity is compared to one or more of minimum velocity A, maximum velocity B, minimum velocity C and maximum velocity D, and in response to the comparison, velocity control method 100 acts to enable VCM decelerate current in step 130, disable VCM current in step 126, or enable VCM accelerate current in step 134. In this manner, velocity control method 100 adjusts the applied VCM current, thereby providing a suitable VCM velocity.

In the preferred embodiment, the velocity of VCM 28 is estimated by using an electronic velocity tachometer (not shown) in driver 12. A bipolar nonlinear control circuit then drives VCM 28 with the accelerate current (step 134), decelerate current (step 130) or coast current (step 126) depending on the comparison with one or more of velocities A, B, C and D. Depending on the comparison, either a VCM current is driven from a rectified spindle back EMF voltage into VCM 28 in a direction such that the actuator velocity converges, or no VCM current flows. This operation is performed when power is removed from the disk drive and requires that energy be extracted from the spindle motor back EMF voltage only.

The electronic velocity tachometer is configured such that the velocity estimate is derived by measurement of the total voltage of VCM 28 and subtracting an estimate of the voltage drop across the internal resistance of VCM 28. The inaccuracy of the scaling factor of the VCM current can degrade the accuracy of the measured back EMF voltages and cause errors in the measured velocity. Voltage transients from the inductance of VCM 28 acting with current changes in VCM 28 are specifically disregarded by the velocity control method by maintaining a commanded acceleration state of actuator 24 for a period of time after a change in the commanded acceleration state has occurred. These transient voltages can degrade the accuracy of the measured back EMF voltages and cause errors in the measured velocity. The addition of hysteresis to velocity control method 100 fundamentally allows large errors in the estimate of the voltage drop across the internal resistance of VCM 28 to exist without significant distortions in the range of velocities, encountered when power is removed from the disk drive.

Ramp unloading of heads 26 in velocity control method 100 prevents damage to the disk surfaces and the resulting loss of user data due to head-to-disk contact when starting or stopping the disk drive due to a commanded operation or power loss. Moreover, in the event of power loss, velocity control system 10 and velocity control method 100 must operate on significantly reduced power, or no power, and be self contained. Since the ramp loading and unloading reliability is a function of control over the velocity of actuator 24 as it moves near and across ramp 18, to maximize the reliability of the head ramp unload operation, accurate control over all VCM actuator velocities in the unload process is required.

Preferably, the measurement of VCM velocity is performed during a head retract operation. In one embodiment, the head retraction operation is achievable using the rectified spindle back EMF voltage. In addition, the use of blanking techniques to suppress incorrect measured velocity transients caused by VCM current changes that corrupt the velocity measurement after a change in state of the retract VCM driver output will greatly improve the range of actuator velocities encountered during the retract process.

Moreover, velocity control method 100 monitors the spindle back EMF voltage such that when the voltage drops below a threshold value, the operation of the retract feature is suspended, suppressing any further head retract operation to avoid improper or unsafe movement of heads 26.

Care must be taken in selecting the ramp angle, VCM torque constant, resistance of spindle motor 22 and VCM 28, gram load force of the head flexure, spindle inertia, and the number of heads such that the retract operation can be successful.

The repeated loop of measuring the VCM velocity to operate heads 26 at a safe velocity can be implemented with sampled linear or switched capacitor networks to achieve the velocity control loop function. For instance, steps 126, 130 and 134 can loop back to a delay for VCM settling in step 112, the VCM current can be detected in step 114, and the VCM settling process can be repeated.

Thus, by implementing velocity control method 100, the desired movement of actuator 24 from the active mode of operation where heads 26 are located on disks 20 to the nonactive mode of operation where heads 26 are located off disks 20 is controlled in a power. down condition to allow reliable operation of the disk drive.

The foregoing described embodiments of the invention are provided as illustrations and descriptions. They are not intended to limit the invention to the precise form described. The functional implementation of the invention described herein may be implemented equivalently in hardware, software, firmware, and/or other available functional components or building blocks. Other variations and embodiments are possible in light of above teachings, and it is thus intended that the scope of invention not be limited by this detailed description, but rather by the following claims.

What is claimed is:

1. A velocity control method for unloading a head off of a disk in a disk drive in response to a power loss condition, comprising:
   measuring a current in a voice coil motor;
   determining whether the measured current relates to acceleration or deceleration;
   measuring a velocity of the voice coil motor; and
   providing an applied current to the voice coil motor in response to the determination and the measured velocity.

2. The method of claim 1, wherein determining whether the measured current relates to acceleration or deceleration includes determining whether the measured current is an accelerate current, a decelerate current or a coast current.

3. The method of claim 1, wherein measuring the velocity includes measuring a voltage across the voice coil motor and subtracting an estimate of a voltage drop across a resistance of the voice coil motor from the measured voltage.

4. The method of claim 1, wherein providing the applied current includes selecting between enabling an accelerate current in the voice coil motor, enabling a decelerate current in the voice coil motor and disabling current in the voice coil motor.

5. A velocity control method for unloading a head off of a disk in a disk drive in response to a power loss condition, comprising:

obtaining back EMF from a spindle motor;

measuring a current in a voice coil motor;

determining whether the measured current is an accelerate current, a decelerate current or a coast current;

measuring a velocity of the voice coil motor;

comparing the measured velocity with a velocity threshold; and providing an applied current to the voice coil motor in response to the determination and the comparison.

6. The method of claim 5, wherein comparing the measured velocity with the velocity threshold includes comparing the measured velocity with only a minimum velocity threshold if the measured current is an accelerate current, comparing the measured velocity with only a maximum velocity threshold if the measured current is a decelerate current, and comparing the measured velocity with a minimum velocity threshold and a maximum velocity threshold if the measured current is a coast current.

7. The method of claim 5, wherein providing the applied current includes disabling current in the voice coil motor if the measured current is an accelerate current and the measured velocity is greater than a minimum velocity threshold, and enabling an accelerate current in the voice coil motor if the measured current is an accelerate current and the measured velocity is less than the minimum velocity threshold.

8. The method of claim 5, wherein providing the applied current includes disabling current in the voice coil motor if the measured current is a decelerate current and the measured velocity is less than a maximum velocity threshold, and enabling a decelerate current in the voice coil motor if the measured current is a decelerate current and the measured velocity is greater than the maximum velocity threshold.

9. The method of claim 5, wherein providing the applied current includes disabling the current in the voice coil motor if the measured current is a coast current and the measured velocity is greater than a minimum velocity threshold and less than a maximum velocity threshold, enabling an accelerate current in the voice coil motor if the measured current is a coast current and the measured velocity is less than the minimum velocity threshold, and enabling a decelerate current in the voice coil motor if the measured current is a coast current and the measured velocity is greater than the maximum velocity threshold.

10. The method of claim 5, wherein providing the applied current includes:

disabling current in the voice coil motor if the measured current is an accelerate current and the measured velocity is greater than a minimum velocity threshold, and enabling an accelerate current in the voice coil motor if the measured current is an accelerate current and the measured velocity is less than the minimum velocity threshold; and disabling current in the voice coil motor if the measured current is a decelerate current and the measured velocity is less than a maximum velocity threshold, and enabling a decelerate current in the voice coil motor if the measured current is a decelerate current and the measured velocity is greater than the maximum velocity threshold.

11. The method of claim 5, wherein providing the applied current includes:

disabling the current in the voice coil motor if the measured current is a coast current and the measured current is greater than a first minimum velocity threshold and less than a first maximum velocity threshold, enabling an accelerate current in the voice coil motor if the measured current is a coast current and the measured velocity is less than the first minimum velocity threshold, and enabling a decelerate current in the voice coil motor if the measured current is a coast current and the measured velocity is greater than the maximum velocity threshold;

disabling current in the voice coil motor if the measured current is an accelerate current and the measured velocity is greater than a second minimum velocity threshold, and enabling an accelerate current in the voice coil Motor if the measured current is an accelerate current and measured velocity is less than the second minimum velocity threshold; and disabling current in the voice coil motor if the measured current is a decelerate current and the measured velocity is less than a second maximum velocity threshold, and enabling a decelerate current in the voice coil motor if the measured current is a decelerate current and measured velocity is greater than the second maximum velocity threshold.

12. The method of claim 11, wherein the first minimum velocity threshold, the second minimum velocity threshold, the second maximum velocity threshold and the first maximum velocity threshold are increasing velocities.

13. The method of claim 11, wherein measuring the velocity includes using an electronic velocity tachometer.

14. The method of claim 11, wherein measuring the velocity includes measuring a voltage across the voice coil motor and subtracting an estimate of a voltage drop across a resistance of the voice coil motor from the measured voltage.

15. The method of claim 5, wherein measuring the velocity includes using an electronic velocity tachometer.

16. The method of claim 5, wherein measuring the velocity includes measuring a voltage across the voice coil motor and subtracting an estimate of a voltage drop across a resistance of the voice coil motor from the measured voltage.

17. A velocity control method for unloading a head off of a disk in a disk drive in response to a power loss condition, comprising:

measuring a current in a voice coil motor;

determining whether the measured current relates to acceleration or deceleration;

measuring a velocity of the voice coil motor using an electronic velocity tachometer; and providing an applied current to the voice coil motor in response to the determination and the measured velocity.

18. The method of claim 17, wherein measuring the velocity includes measuring a voltage across the voice coil motor and subtracting an estimate of a voltage drop across a resistance of the voice coil motor from the measured voltage.

19. The method of claim 18, wherein determining whether the measured current relates to acceleration or deceleration includes determining whether the measured current is an accelerate current, a decelerate current or a coast current.

20. The method of claim 18, wherein providing the applied current includes selecting between enabling an accelerate current in the voice coil motor, enabling a decelerate current in the voice coil motor and disabling current in the voice coil motor.

* * * * *